Woodman & Atwood.
Horse Rake.

No. 61646 — Patented Jan. 29 1867

Witnesses.
Jos. L. Coombs

Inventors.
Munson Woodman &
Leonard Atwood
By J.S. Coombs
their Atty.

United States Patent Office.

MANSON WOODMAN, OF FARMINGTON, MAINE, AND LEONARD ATWOOD, OF NORWICH, CONNECTICUT.

Letters Patent No. 61,646, dated January 29, 1867.

IMPROVEMENT IN HORSE RAKES

*The Schedule referred to in these Letters Patent and making part of the same.*

TO ALL WHOM IT MAY CONCERN:

Be it known that we, MANSON WOODMAN, of Farmington, in the county of Franklin, and State of Maine, and LEONARD ATWOOD, of Norwich, in the county of New London, and State of Connecticut, have invented a new and useful Improvement in Horse-Rakes; and we do hereby declare that the following is a full and exact description thereof, reference being had to the accompanying drawings, and to the letters of reference marked thereon.

Our improvement relates especially to the horse-rake patented by Calvin Delano, February 27, 1849, but is applicable to all rakes constructed on the same generel principle, whether each tooth has a separate and independent movement or the whole series of teeth are rigidly attached to a frame or bar, so that they must necessarily rise and fall together.

The nature of our improvement consists in a novel device by means of which the power of the horse is made available to raise the teeth and deposit the hay which the rake has gathered at any desired point in the path over which the rake is passing. In the accompanying drawings—

Figures 1, 3:
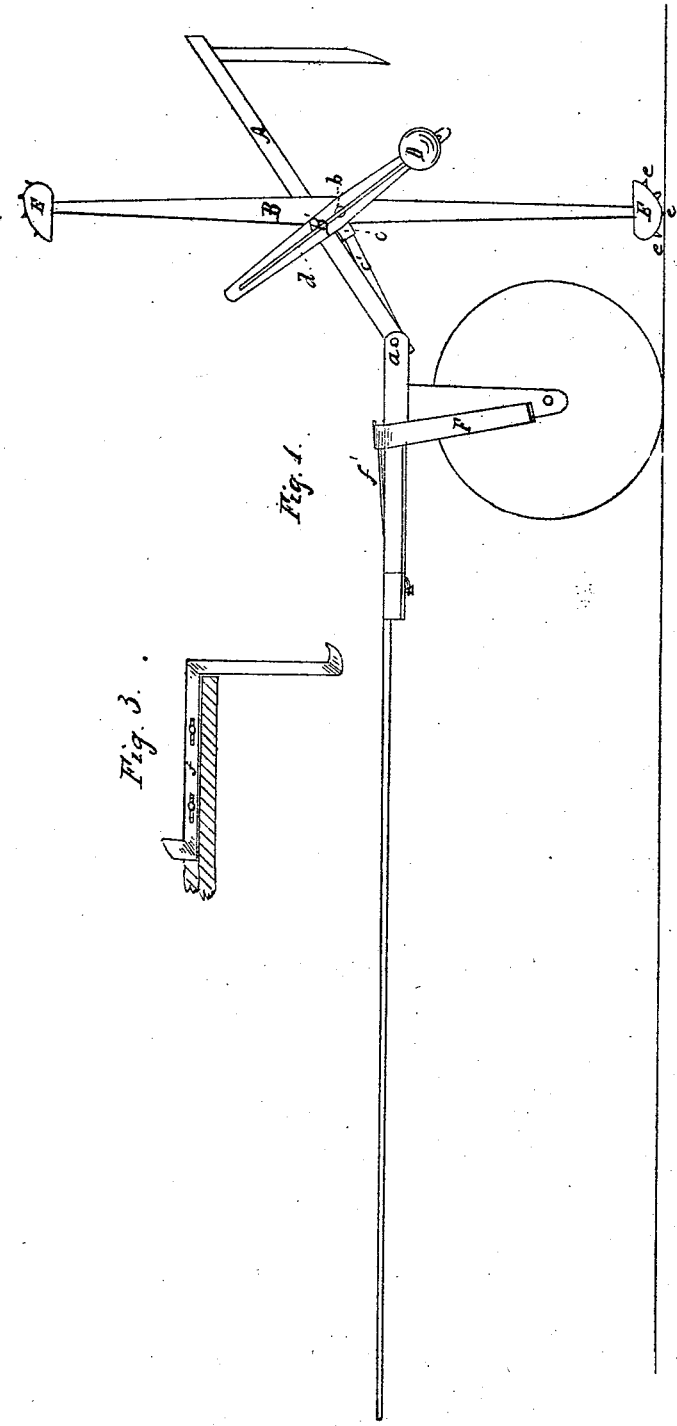
Figure 1 is a side view of a Delano rake with our improvement attached, the teeth being elevated to drop the hay which has been gathered.
Figure 3 is a side view, in perspective, of the stirrup which supports the elevating shaft B when the teeth are down, as shown in fig. 2.
Figure 2:
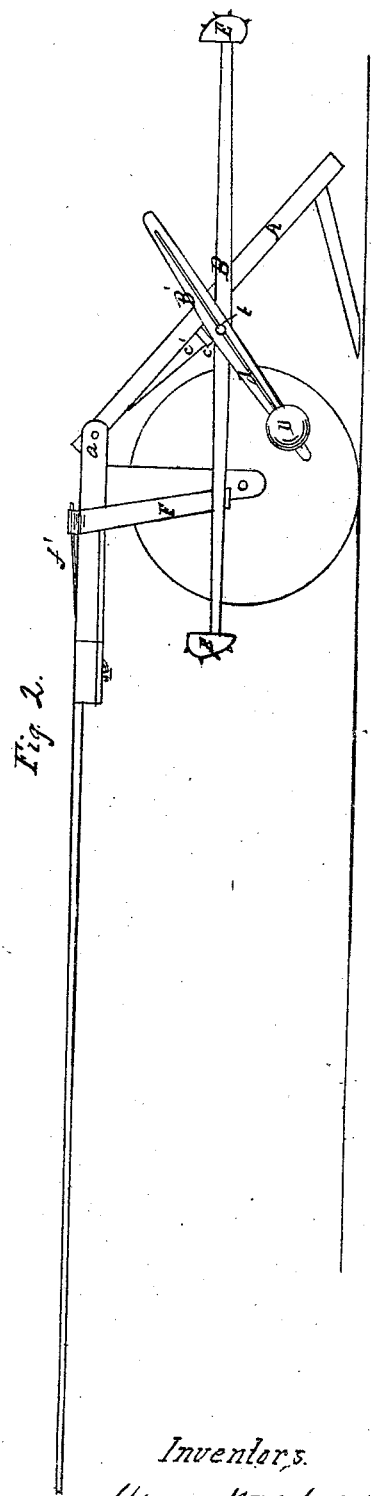
Figure 2 is a similar view, the teeth being upon the ground in position for raking.

A is one of the series of bars to which the teeth are attached. All these bars turn upon a rod, $a$, forming a common pivot, and each bar may have a separate and independent movement upon said pivot, (as in the Delano rake,) or may be rigidly framed together, our improvement being equally applicable in either case. B is an elevating shaft attached rigidly to the end of a cylindrical iron shaft, $b$, which crosses the series of rake-bars A at right angles beneath them. Said cylindrical shaft $b$ lies parallel to another cross-bar, $c$, to which it is hinged by passing through a series of metal eyelets or loops attached to said cross-bar $c$. Said cross-bar $c$ is supported by two bars, $c'$, which are hinged or pivoted on the same rod, $a$, which passes through the upper ends of the rake-bars A. B' is a shaft crossing the elevating shaft B, at the angle shown in the drawings, and rigidly fixed in that position, relatively to said elevating shaft. D is a metal ball, which slides on a large wire or small rod of iron, $d$, passing through its axis, the ends being bent and attached to the shaft B', forming a broad staple. E E are feet attached to each end of the elevating shaft B, provided with spurs, $e\ e$, to take hold of the ground when the foot comes in contact therewith. F is a stirrup to support the elevating shaft B in a horizontal position while the teeth are down and the rake operating to gather the hay. This stirrup, the form of which is shown in fig. 3, rests on a cross-bar between the rear ends of the shafts or thills, and the part $f$, which lies upon said cross-bar, slides longitudinally thereon, a sufficient distance to withdraw the foot of the pendent stirrup from beneath the elevating bar B, and let its front end drop to the ground. A spring, $f'$, (shown in figs. 1 and 2,) keeps said stirrup out, in proper position to receive and support the elevating shaft B, except when drawn back to let the bar fall. The driver has his seat between the thills, opposite said stirrup, and can draw the same inward at pleasure by means of a suitable handle or lever connected therewith. On the opposite side of the machine duplicates of the elevating shaft B, the cross-shaft B', and the ball D, are affixed to the opposite end of the shaft $b$, said elevating shaft and cross-shaft, on each side of the machine, being fixed in the same planes.

The operation is as follows: When the rake, being in the position shown in fig. 2, has gathered as much hay as it will well hold, the driver draws the stirrup F towards him, withdrawing its foot from under the shaft B, when the ball on the lower end of the shaft B' causes the front end of shaft B to fall immediately to the ground, and the spurs $e\ e$, on the foot E, catch in the turf and prevent the foot from slipping. As the machine moves forward the rear end of said shaft B must necessarily rise, carrying the cross-bars $b$ and $c$, and the rake-bars A, which rest thereon, till the parts assume the position shown in fig. 1. As the machine passes on, the said shaft B must continue to revolve, so long as the foot on its lower end adheres to the ground, and before said foot leaves the ground the cross-bar B' will have assumed such an inclined position that the ball D will slide to its opposite end, and its weight will carry down the front end of the shaft B until it rests upon the stirrup F, the teeth at the same time dropping to the ground.

Having thus fully described our invention, and its mode of operation, what we claim as new, and desire to secure by Letters Patent, is—

The combination of the elevating shafts B, the cross-shafts B', the balls D, and the stirrup F, all constructed, arranged, and operating substantially as and for the purpose described.

MANSON WOODMAN,
LEONARD ATWOOD.

Witnesses to WOODMAN:
  D. C. MORRILL,
  C. P. MORRILL.
Witnesses to ATWOOD:
  J. J. COOMBS,
  J. L. COOMBS.